(12) United States Patent
Pean

(10) Patent No.: US 12,394,131 B2
(45) Date of Patent: Aug. 19, 2025

(54) GRAPHICS PROCESSING ARCHITECTURE IN A CLOUD GAMING ENVIRONMENT

(71) Applicant: Netflix, Inc., Los Gatos, CA (US)

(72) Inventor: Gregoire Pean, San Francisco, CA (US)

(73) Assignee: Netflix, Inc., Los Gatos, CA (US)

(*) Notice: Subject to any disclaimer, the term of this patent is extended or adjusted under 35 U.S.C. 154(b) by 237 days.

(21) Appl. No.: 18/340,017

(22) Filed: Jun. 22, 2023

(65) Prior Publication Data

US 2024/0428499 A1 Dec. 26, 2024

(51) Int. Cl.
*G06T 1/20* (2006.01)
*A63F 13/355* (2014.01)
*G06T 1/60* (2006.01)
*G06T 15/00* (2011.01)

(52) U.S. Cl.
CPC .......... *G06T 15/005* (2013.01); *A63F 13/355* (2014.09); *G06T 1/20* (2013.01); *G06T 1/60* (2013.01)

(58) Field of Classification Search
CPC ........ H04N 19/436; G09G 5/363; G06T 1/20; G06T 1/60; G06T 15/005; A63F 13/355; A63F 13/358; A63F 13/40; A63F 13/50; A63F 13/77
USPC .......................................... 345/501, 506, 522
See application file for complete search history.

(56) References Cited

U.S. PATENT DOCUMENTS

| | | | |
|---|---|---|---|
| 7,830,388 B1 | 11/2010 | Lu | |
| 8,442,311 B1 | 5/2013 | Hobbs | |
| 9,233,299 B2 * | 1/2016 | Wilkiewicz | ......... A63F 13/5258 |
| 2011/0157196 A1 * | 6/2011 | Nave | ..................... A63F 13/358 |
| | | | 345/522 |

(Continued)

FOREIGN PATENT DOCUMENTS

| CN | 106390449 A | 2/2017 |
|---|---|---|
| CN | 113141511 A | 7/2021 |

(Continued)

OTHER PUBLICATIONS

Hong et al., GPU Virtualization and Scheduling Methods: A Comprehensive Survey, ACM Computing Surveys, vol. 50, No. 3, Article 35, Jun. 2017; 37 pages.

(Continued)

*Primary Examiner* — Jacinta M Crawford
(74) *Attorney, Agent, or Firm* — Greenberg Traurig, LLP

(57) ABSTRACT

The disclosed computer-implemented method includes instantiating a simulated library in a shared memory that is shared between a plurality of hardware components in a graphics processing unit (GPU), diverting media frame generation input events produced as part of a multimedia application to the simulated library in the shared memory, selecting at least one media frame for rendering, according to the media frame generation input events, from within the simulated library in the shared memory, queueing the selected media frame for encoding before rendering of the selected media frame is complete and, upon determining that the selected media frame has been rendered, encoding the rendered media frame according to the queue. Various other methods, systems, and computer-readable media are also disclosed.

20 Claims, 8 Drawing Sheets

(56) References Cited

U.S. PATENT DOCUMENTS

| | | | |
|---|---|---|---|
| 2014/0187331 A1* | 7/2014 | Kim | A63F 13/12 |
| | | | 375/240.07 |
| 2017/0064320 A1* | 3/2017 | Sadhwani | G06T 1/20 |
| 2018/0174612 A1* | 6/2018 | Schulz | G11B 20/10527 |
| 2022/0130096 A1 | 4/2022 | Zhang | |
| 2023/0016903 A1 | 1/2023 | Colenbrander | |

FOREIGN PATENT DOCUMENTS

| | | | |
|---|---|---|---|
| CN | 113542794 A | 10/2021 | |
| CN | 115920372 A | 4/2023 | |

OTHER PUBLICATIONS

International Search Report and Written Opinion for International Application No. PCT/US2024/034439, mailed Oct. 18, 2024; 16 pages.

Lee et al., "VADI: GPU Virtualization for an Automotive Platform", Feb. 2016, IEEE Transactions on Industrial Informatics, vol. 12, No. 1, p. 277-290; 14 pages.

Liu et al., "Cutting the Cord: Designing a High-Quality Untethered VR System with Low Latency Remote Rendering", 2018, Association for Computing Machinery, p. 68-80; 13 pages.

* cited by examiner

GRAPHICS PROCESSING ARCHITECTURE IN A CLOUD GAMING ENVIRONMENT

BACKGROUND

In cloud gaming scenarios, video game data (including graphics) are largely rendered on remote servers and then transmitted to gaming clients where those data are decoded and displayed on an electronic device. When processing this video game data, graphics processing units (GPUs) implement multiple different hardware components, including rendering and encoding components. In traditional graphics capturing systems or cloud gaming systems, images are first rendered and then encoded at a specific resolution and frame rate. This encoding process may only occur after the image is rendered. As such, GPUs will first render a frame and then queue that frame for encoding at the encoder. This process of queueing the frame after it has been fully rendered, however, may lead to longer processing times for each video frame and may thus lead to lags or slowdowns in cloud games.

SUMMARY

As will be described in greater detail below, the present disclosure provides methods and systems for efficiently processing graphics within a graphics processing architecture. In some cases, a computer-implemented method may be provided that includes: instantiating a simulated library in a shared memory that is shared between a plurality of hardware components in a graphics processing unit (GPU), diverting media frame generation input events produced as part of a multimedia application to the simulated library in the shared memory, selecting at least one media frame for rendering, according to the media frame generation input events, from within the simulated library in the shared memory, queueing the selected media frame for encoding before rendering of the selected media frame is complete and, upon determining that the selected media frame has been rendered, encoding the rendered media frame according to the queueing.

In some embodiments, the selected frame is a video frame. In other embodiments, the selected frame is an audio frame. In some cases, the multimedia application is a video game. In some examples, the frame generation input events are generated as part of a swapchain process running on the GPU, and the frame generation input events are diverted to the simulated library in shared memory without altering the swapchain process.

In some cases, the method further includes inserting the encoded rendered frame back into the swapchain process of an associated Vulkan driver. In some embodiments, the simulated library allows the media frame to be rendered and encoded without creating an input window. In some cases, peripheral inputs are injected at a predetermined injection point at a multimedia application process level. In some examples, the multimedia application functions as if the multimedia application were communicating directly with a display server.

In some embodiments, media frame references and audio buffers are provided to a game support process, creating a pipeline directly from the multimedia application to an encoder. In some cases, the created pipeline directly from the multimedia application to the encoder allows synchronization to be performed on the GPU without support from an associated central processing unit (CPU). In some examples, the CPU provides at least one of: metadata, one or more fence references, or one or more frame references to one or more components of the GPU, while the synchronization is performed between hardware components of the GPU.

In addition, a corresponding system includes at least one physical processor, and physical memory comprising computer-executable instructions that, when executed by the physical processor, cause the physical processor to: instantiate a simulated library in a shared memory that is shared between a plurality of hardware components in a graphics processing unit (GPU), divert one or more media frame generation input events produced as part of a multimedia application to the simulated library in the shared memory, select at least one media frame for rendering, according to the one or more media frame generation input events, from within the simulated library in the shared memory, queue the selected media frame for encoding before rendering of the selected media frame is complete, and upon determining that the selected media frame has been rendered, encode the rendered media frame according to the queueing.

In some embodiments, diverting the media frame generation input events produced as part of a multimedia application to the simulated library allows dynamic control over the frame rate of the media frames produced by the multimedia application. In some cases, diverting the media frame generation input events produced as part of a multimedia application to the simulated library in the shared memory allows the multimedia application to be suspended for at least a specified amount of time. In some examples, upon determining that a client device has dropped one or more media frames, the system reencodes the dropped frame by the GPU.

In some cases, a pacing module is implemented within the GPU to avoid synchronization drift with an associated output display. In some cases, the system further attaches a plurality of video pipelines to one or more swapchain instances that are generated as part of the multimedia application. In some embodiments, video feeds from multiple different cameras are fed to different video pipelines among the plurality of video pipelines.

In some examples, the above-described method is encoded as computer-readable instructions on a computer-readable medium. For example, the computer-readable medium may include one or more computer-executable instructions that, when executed by at least one processor of a computing device, cause the computing device to instantiate a simulated library in a shared memory that is shared between a plurality of hardware components in a graphics processing unit (GPU), divert one or more media frame generation input events produced as part of a multimedia application to the simulated library in the shared memory, select at least one media frame for rendering, according to the one or more media frame generation input events, from within the simulated library in the shared memory, queue the selected media frame for encoding before rendering of the selected media frame is complete, and upon determining that the selected media frame has been rendered, encode the rendered media frame according to the queueing.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification.

Together with the following description, these drawings demonstrate and explain various principles of the present disclosure.

Figure 1:
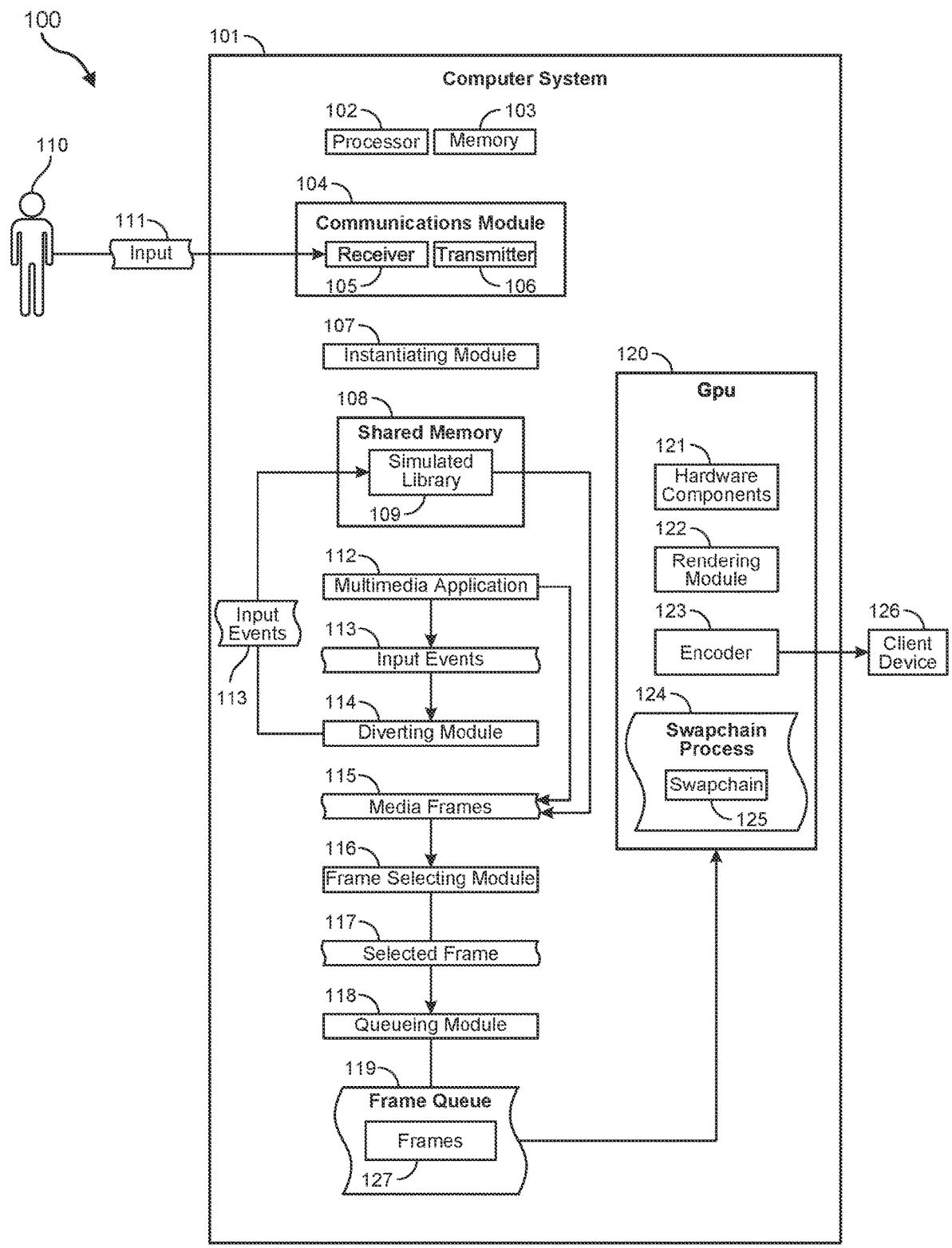
FIG. 1 illustrates a computing environment in which the embodiments herein are designed to operate.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The present disclosure is generally directed to methods and systems for efficiently processing graphics within a graphics processing architecture. As noted above, applications, such as video games, are often hosted remotely on cloud computing systems. These cloud computing systems are capable of running many thousands or millions of concurrent gaming instances across many different games. As part of hosting these gaming instances, cloud computing systems implement many simultaneous graphics processing units (GPUs) to render and encode video frames. These video frames are then streamed to client devices (e.g., televisions, phones, tablets, etc.) over the internet or other networks where they are presented to users.

Traditional GPUs receive inputs from gaming engines indicating how a given frame is to be rendered. These inputs may indicate game elements, position information, lighting information, background information, or other data that may indicate how a given video frame or series of video frames are to be generated. The GPU's rendering components may then render the video frame and prepare the frame for encoding. The GPU's encoder will then take the rendered video frame and encode it at a given resolution and/or at a given frame rate. The resolution and frame rate may differ for different playback devices or for different regions. As part of this process, the GPU will render the video frame and then put the frame in a queue for encoding. This process, in traditional GPUs, does not allow for pipelining between these tasks. As such, encoding is performed subsequently to the rendering, necessitating at least some time gap between the rendering and the encoding. This time gap may lead to delays in encoding and may result in lower frame rates, lags in game play, or other deleterious effects. These effects may cause users to play fewer games or stop playing some games altogether.

In contrast to traditional rendering plus encoding processes, the embodiments herein pipeline the rendering and encoding processes using an improved graphics processing architecture. Using the graphics processing architecture described herein, GPUs can queue video frames for encoding before the rendering is even complete. Thus, while the video frame is being rendered, the unfinished video frame is, in advance, inserted into the encoding queue. Then, as soon as rendering completes, the rendered video frame will have already worked its way through the encoding queue and is immediately encoded without having to wait through the encoding queue, as would be the case in traditional systems.

This advance queueing process may occur without any blocking or waiting by the hardware encoding components themselves. Still further, this improved graphics processing architecture provides dynamic control over the encoded frame rate. Thus, for example, this graphics processing architecture could switch instantly from 30 frames per second (fps) to 60 fps. Accordingly, in video games where a higher frame rate is advantageous, the graphics processing architecture could switch from 30 fps to 60 fps dynamically and could do so without blocking or waiting for the hardware encoding components. These embodiments will be described in greater detail below with regard to FIGS. 1-8.

FIG. 1 illustrates a computing environment 100 that includes a computer system 101. The computer system 101 includes software modules, embedded hardware components such as processors, or includes a combination of hardware and software. The computer system 101 includes substantially any type of computing system including a local computing system or a distributed (e.g., cloud) computing system. In some cases, the computer system 101 includes at least one processor 102 and at least some system memory 103. The computer system 101 includes program modules for performing a variety of different functions. The program modules are hardware-based, software-based, or include a combination of hardware and software. Each program module uses computing hardware and/or software to perform specified functions, including those described herein below.

The computer system 101 includes a communications module 104 that is configured to communicate with other computer systems. The communications module 104 includes any wired or wireless communication means that can receive and/or transmit data to or from other computer systems. These communication means include hardware interfaces including Ethernet adapters, WIFI adapters, hardware radios including, for example, a hardware-based receiver 105, a hardware-based transmitter 106, or a combined hardware-based transceiver capable of both receiving and transmitting data. The radios are cellular radios, Bluetooth radios, global positioning system (GPS) radios, or other types of radios. The communications module 104 is configured to interact with databases, mobile computing devices (such as mobile phones or tablets), embedded or other types of computing systems.

The computer system 101 also includes an instantiating module 107. The instantiating module 107 is configured to instantiate a simulated library 109 in a shared memory 108 that is shared between multiple hardware components 121 in a graphics processing unit (GPU) 120. The simulated library 109 provides a library of application files that may be used to perform different functions while running a cloud game. In contrast with a conventional file library, however, the simulated library 109 runs in a shared memory 108 and processes input events 113 that have been diverted from the conventional file library. In this manner, the underlying game engine running the cloud game may think that it is sending its game processing input events 113 to a legitimate, conventional file library when, in fact, the events are being diverted to the simulated library 109 in the shared memory 108.

In some embodiments, the simulated library 109 in the shared memory 108 may refer to a Vulcap module, while in other cases, the simulated library may refer to an SDLX module (both of which are described further below with regard to FIG. 3). Both the Vulcap module and the SDLX are hooking libraries that are loaded or injected in the game or application process itself. In these embodiments, the Vulcap module and the SDLX share the memory of the game. But, those libraries also share GPU memory (VRAM) with a GSP/encoding process. As such, the simulated library 109 in the shared memory 108 may refer to a swapchain hook library, or a controls/windowing hook library. Moreover, the shared memory 108 may be VRAM resources (e.g., render targets, framebuffers, etc.) or just system memory or shared memory spaces between the game and those libraries.

Along these lines, the computer system 101 further includes a diverting module 114 that is configured to divert media frame generation input events 113 produced as part of a multimedia application 112 (e.g., a cloud video game) to the simulated library 109 in the shared memory 108. The diverting module 114 receives media frame generation input events 113 and diverts those events to the simulated library 109 instead of a traditional file library. The frame selecting module 116 of computer system 101 then selects at least one media frame 115 for rendering, according to the media frame generation input events 113, from within the simulated library 109 in the shared memory 108.

The selected media frame 117 may be selected for rendering or may currently be in the process of being rendered (e.g., by rendering module 122) and may be ready or nearly ready for encoding by the encoder 123. The queueing module 118 then enqueues the selected media frame 117 for encoding before rendering of the selected media frame 117 is complete. Then, upon the computer system 101 determining that the selected media frame 117 has been rendered by the rendering module 122, the encoder 123 encodes the rendered media frame 127 according to the queued position in the frame queue 119. These embodiments will be explained further below with regard to method 200 of FIG. 2.

Figure 2:
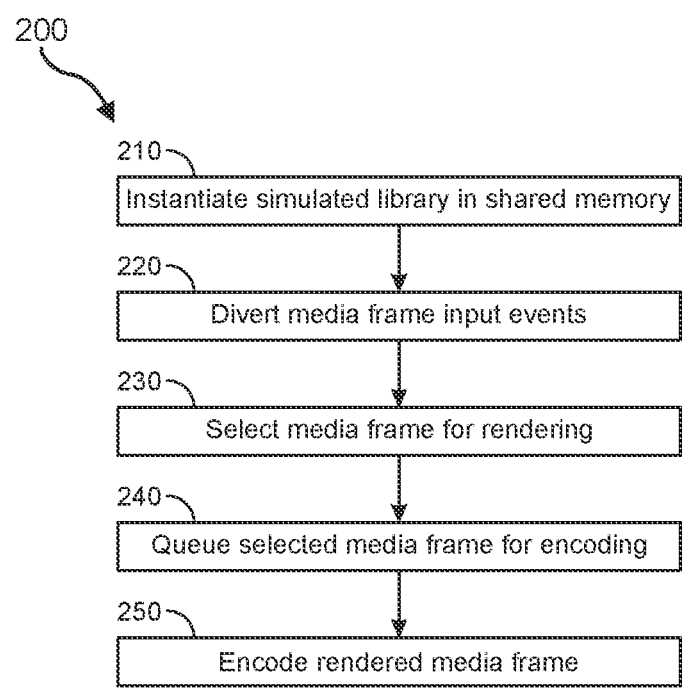
FIG. 2 is a flow diagram of an exemplary method for efficiently processing graphics within a graphics processing architecture.

FIG. 2 is a flow diagram of an exemplary computer-implemented method 200 for efficiently processing video game graphics. The steps shown in FIG. 2 may be performed by any suitable computer-executable code and/or computing system, including the system illustrated in FIG. 1. In one example, each of the steps shown in FIG. 2 may represent an algorithm whose structure includes and/or is represented by multiple sub-steps, examples of which will be provided in greater detail below.

As illustrated in FIG. 2, a computer-implemented method 200 may be provided that includes: instantiating, at step 210, a simulated library 109 in a shared memory 108 that is shared between multiple hardware components 121 in a graphics processing unit 120. The method 200 further includes, at step 220, diverting media frame generation input events 113 produced as part of a multimedia application 112 (e.g., a cloud-based video game) to the simulated library 109 in the shared memory 108 and selecting, at step 230, at least one media frame 115 for rendering, according to the media frame generation input events 113, from within the simulated library 109 in the shared memory 108. The method 200 also includes, at step 240, queueing the selected media frame 117 for encoding before rendering of the selected media frame is complete and, at step 250, upon determining that the selected media frame 117 has been rendered, encoding the rendered media frame according to the queueing in the frame queue 119.

As used herein, the term "shared memory" may refer to memory that is shared between different hardware and/or software components. These hardware and software components can reside on the GPU 120 or on other GPUs, on the computer system 101 or on other computer systems. The GPUs and computer systems may be local or remote and may be part of the same system or may be independent of each other. The shared memory 108 may include volatile or non-volatile memory or combinations thereof.

The term "simulated library" may refer to a file repository or file storage area that includes dynamic link libraries, applications, programs, functions, or other computer-executable code. The reference to "simulated" indicates that the simulated library 109 is different from a traditional library that is not hosted in shared memory. The simulated library is designed to appear and act like a traditional library, providing access to specific files or functions, but, instead of residing as a separate entity within the computer system or within the game engine, the simulated library resides directly in the game engine. This allows input events to be diverted to the simulated library 109 and handled within the game engine. This, in turn, streamlines the graphics generation process, decreasing the time needed to render video frames and decreasing the time needed to prepare a video frame for encoding.

The term "cloud game" or "cloud-based game" may refer to any type of video game provided over a local network and/or over the internet where a backend server provides at least some of the data used to play the game. In some cases, cloud-based servers may render and encode the video frames that are sent to the client device 126 for display to the user. In other cases, the cloud-based servers may receive inputs and calculate changes to the game, while offloading some or all of the video rendering to the client device.

The cloud games or other multimedia applications (e.g., video streaming, audio streaming, interactive content, etc.) may be processed by the GPU 120 and/or by the computer system 101. In some cases, the GPU 120 may be part of the computer system 101 and, in other cases, the GPU 120 may be separate from the computer system. When the computer system 101 and/or GPU 120 are generating video frames as part of a multimedia application, the frame selecting module 116 selects certain frames that are to be rendered by the rendering module 122. These frames may be video frames or audio frames and may be part of a video game, part of a movie, part of a song, or part of other content.

In some cases, media frame generation input events 113 are generated as part of the multimedia application 112 running on the computer system 101. The frame generation input events 113 provide details regarding a video or audio frame or series of frames, including information about how the frame is to be generated. In some cases, the frame generation input events 113 are generated as part of a swapchain process 124 running on the GPU 120. The swapchain process is described further below with regard to embodiment 300 of FIG. 3.

Figure 3:
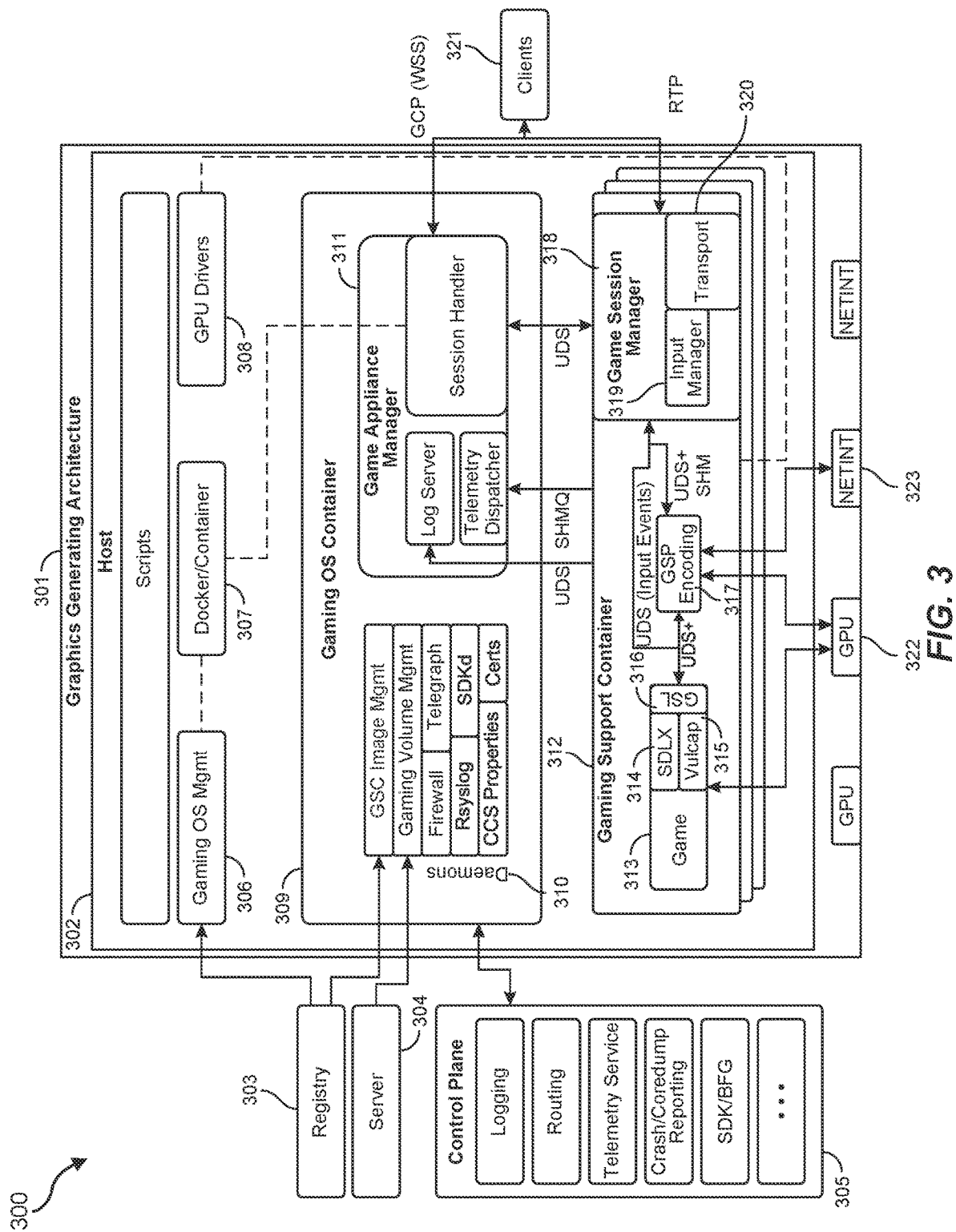
FIG. 3 illustrates an alternative computing environment in which the embodiments herein are designed to operate.

FIG. 3 describes a graphics generating architecture 301 that includes a plurality of different components. For example, the graphics generating architecture 301 includes a host computing system 302 (or computing instance) that, itself, includes different components and modules including a gaming operating system (OS) management module 306, a docker/container 307, GPU drivers 308, a gaming OS container 309, a registry 303, a server instance 304, a control plane 305, various process daemons 310, and other modules.

In some embodiments, a Vulkan layer (e.g., a shared object within software code) is loaded in a cloud-based game 313 process by a Vulkan loader. The Vulkan loader intercepts and reimplements swapchain calls in order to cause the cloud game 313 to render directly to Vulkan images. These images (i.e., video frames) are controlled by the gaming support container 312 (as opposed to a third party that may own or control the cloud game). The gaming support container 312, is part of the graphics generating architecture 301 and is controllable by a user (e.g., user 110 of FIG. 1 via input 111). The gaming support container 312 exports the images as file descriptors outside of the gaming support container to the game session manager 318.

The GSP 312 includes an SDLX module 314. The SDLX module is a shared object within a software language that is preloaded into the game process. The SDLX module 314 intercepts library calls (which may be invoked by the SDL on behalf of another application) by hooking and redirecting the commands. The SDLX module 314 is configured to remove the dependency to a gaming server (e.g., an X server) and make the game headless (i.e., able to run without specific components such as an X window). The graphics generating architecture 301 aims to avoid interaction with a specific server (e.g., a Linux-based X server), which would add overhead to the graphics generation process. The SDLX module 314 intercepts the swapchain via Vulcap 315, and the graphics generating architecture 301 avoids sending images to the X server for compositing. In order to achieve this, the architecture reimplements or simulates various Xlib and X library calls inside SDLX and presents itself to the cloud game 313 as a legitimate X library.

The SDLX module 314 further provides a non-intrusive input injection mechanism by funneling input events into the simulated Xlib implementation. Moreover, the SDLX module 314 provides an in-game-process, zero-latency audio capture mechanism by intercepting and/or simulating advanced Linux sound architecture (ALSA) library calls and presenting itself as a legitimate ALSA implementation.

The game support layer (GSL) 316 is a shared library that is used by or shared between the SDLX module 314 and Vulcap 315. The GSL 316 interfaces with the GSP encoder 317. The GSL 316 contains a game streaming session singleton, which handles the capture and injection lifecycle of the cloud game. This includes setting up the connection to the GSP: socket signaling and sharing, as well as shared memory setup for sharing audio pulse-code modulation (PCM) buffers with the GSP, handling pacing of the game render loop at desired frame rate, and/or handling pacing of audio buffer writes.

The game support process is a software program that connects to the cloud game 313 via the GSL and handles multiple low-level duties including receiving swapchain image references from Vulcap 315 in order to encode them (via GSP encoder 317), after having performed color space conversion, if necessary. The video encoder may have multiple different implementations available based on the encoder manufacturer and/or GPU manufacturer (e.g., depending on whether the GPU manufacturer and encoder manufacturer are separate) and may receive the audio buffers from SDLX and encode them. The GSP hands over the encoded bitstreams to the GSM session manager (318) over shared memory. The GSP also receives orders from the GSM, including indicating when the GSP is to emit a new instantaneous decoder refresh (IDR) frame. This IDR frame is a standalone frame that does not depend on the history of previously encoded frames in order to be fully decoded.

The game session manager (GSM) 318 is a software program that handles different aspects of the game session. The transport module 320 handles audio/video real time transport (e.g., via WebRTC) browsers or other applications. The transport module 320 also handles signaling and negotiation, handles input protocols, consumes input states at the input manager 319 from the transport or from other dedicated network channels, depending on the input device, feeds those input events directly to the game via the GSL 316, collects metrics and logs from other local components (GSP, GSL), and synthesizes or acts upon those metrics as necessary.

The game appliance manager (GAM) 311 is a software program that supervises or manages gaming appliances. The GAM311 is configured to spawn, manage, and monitor the game session container 309, handle game mounts and game installs, listen for client connections (e.g., 321), handle various protocols, receive game start requests, negotiate real-time audio/video stream transport modalities over the network through session description protocol (SDP) exchanges to the GSM 318, and proxy game control messages (e.g., game pause commands or other commands).

Video frames are captured by Vulcap 315 in a non-intrusive, copy-free way. Vulcap reimplements the Vulkan swapchain functions, meaning that it provides the images that are to be rendered to the game engine, as the game engine acquires them. When the game engine is finished queuing render command buffers to the GPU driver, the game engine calls the present swapchain function. The graphics generating architecture will then send this image reference (e.g., a file descriptor) over to the GSP encoder 317 so that the image can be queued for encoding as soon as possible.

At least in some cases, these functions occur asynchronously from the actual GPU work and video encoder work. The GSP will have enqueued the image for encoding before the GPU is done rendering the frame. Vulcap and the GSP, in effect, work in advance of the GPU and the encoder, without any blocking, or waiting on the hardware itself. The GPU and video encoder run freely and unobstructed by the CPU, while the CPU runs freely and unobstructed by the GPU.

Figure 4:
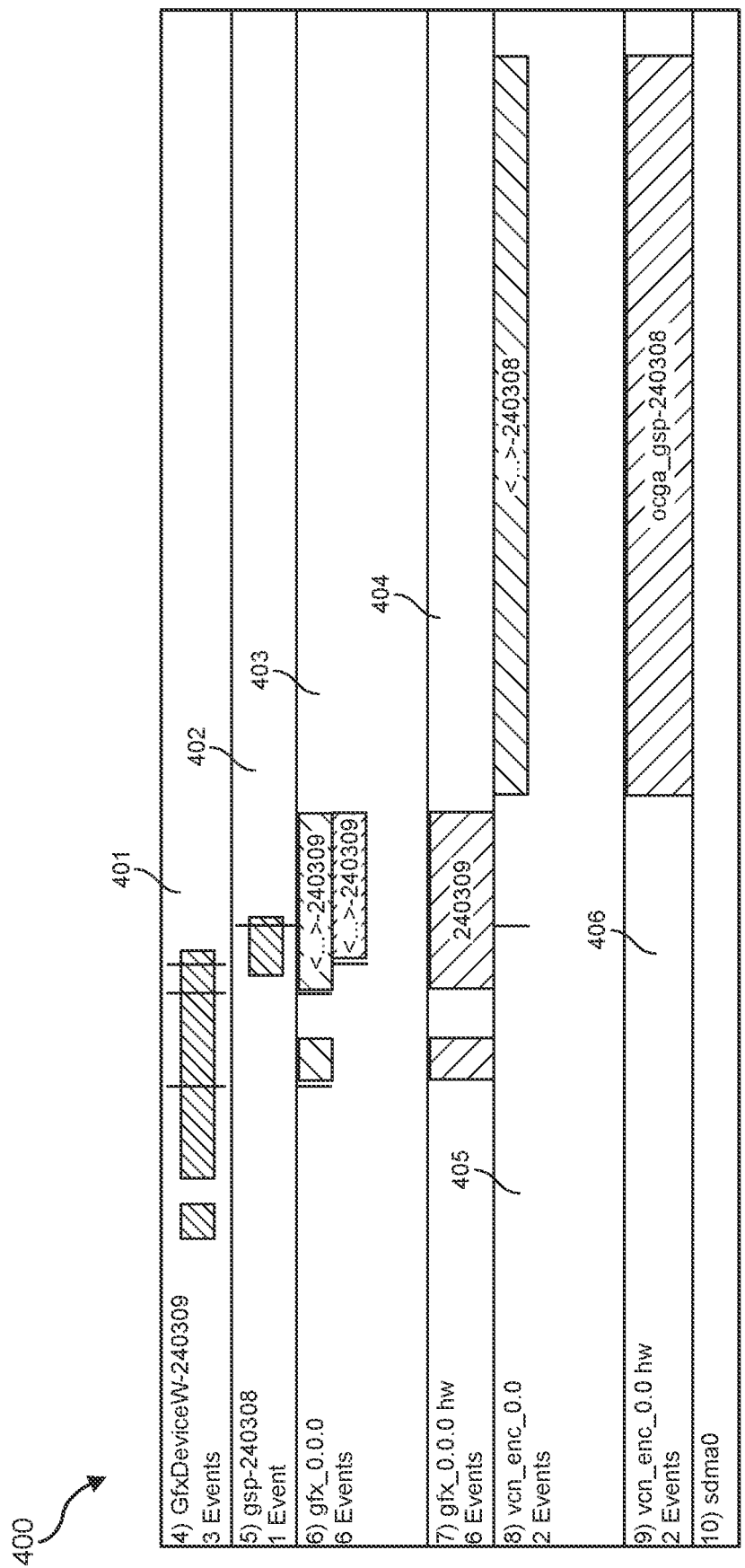
FIG. 4 illustrates an embodiment in which rendering and encoding processes may be pipelined for more efficient processing.

FIG. 4 illustrates an embodiment 400 of a GPU processing trace. In this trace, the pipelining of various GPU events can be seen. For example, at 4), a cloud game engine issues render commands (forward slash bars 401 indicate CPU activity), at 5) the GSP receives the presented image (402) and queues the encoding based on the events (403), at 7) GPU hardware activity (as shown in the backslash bars at 404) indicates that the render is still ongoing when the GSP is already done enqueueing the encoding (405), and at 9) the video encoder hardware picks up the frame as soon as the GPU is done rendering (406) without further intervention from the GSP. Thus, in the embodiments herein, video or audio frames may be queued for encoding before they have finished rendering, thereby leading to faster processing of video frames and a more favorable gameplay experience.

In some cases, the embodiments described herein operate without creating external elements to capture keyboard and mouse inputs. For example, game engines running on certain operating systems (e.g., Linux) will expect to create an "X window" to capture keyboard and mouse events. The X window will also provide a place for the Vulkan (or GL) swapchain to have a destination for the set of (e.g., 2-3) swapchain images or framebuffers. This X window is then composited with the rest of the desktop, unless in full screen mode. However, for a cloud gaming service, where there is no display or desktop, and where many hundreds or thousands of concurrent sessions (or more) may be running, the dependency on creating an X window greatly reduces processing efficiency. Intercepting or replacing the swapchain most optimally (at the graphics API level) means that the X window will not receive images to display, even if an X window is created. The embodiments herein avoid creating an X window and associated resources in the first place.

In contrast, the embodiments herein inject keyboard and mouse inputs directly at the game process level, bypassing the creation of X windows that lead to increased complexity and increased latency. The SDLX, as noted above, nullifies and/or simulates the dependencies that are to be avoided in the cloud game. Instead, the SDLX provides hooking and injection capture points for inputs (e.g., mouse and keyboard inputs), as well as audio (e.g., SDLX hooks multiple libraries and, as such, at least in some cases, ALSA hooking is performed by the SDLX as well). This allows cloud games to be operated on specific operating systems without having to create or use X windows. This is performed without modifying the game engines, thus allowing third parties to continue providing games without having to modify their games to work with the graphics processing architectures described herein.

At least in some embodiments, a game loop pacer and/or an audio pacer is implemented within the GSL library. The game loop pacer (or audio pacer) is configured to make up for any lack of hardware clocking, and pace the free-running threads within a game engine to a desired rate. The game loop pacer does this by using a real time locking system call (e.g., a futex) for scheduling precision. The game loop pacer can be woken up early or on demand, from the GSP or GSM, if a frame is to be rendered as soon as possible (e.g., when the transport session starts (rather than waiting up to 33 ms)). Another benefit is that the game loop pacer has dynamic control over the frame rate. That is, the game loop pacer may switch from 30 fps to 60 fps instantly, for example.

Still further, suspension (pausing) may be forced upon the cloud game at any point by making the game loop pacer wait indefinitely using the locking system call. Each of these changes of the frame rate and suspension are performed without having to modify the game engine. As such, this allows third parties to provide games for a gaming platform, and those games will run properly without needing to be modified to work with the game loop pacer. The game loop pacer uses hooks within the simulated library to perform the desired tasks without the game engine realizing that changes are being made. In some cases, game loop pacers are configured to account for latencies in OS kernels when computing the time they need to wait next. The game loop pacers then correct course and guarantee an average clock rate so that the transport and/or client will not have to make up for this drift or skew themselves, and either catch up or wait for consistently late packets.

Figure 5:
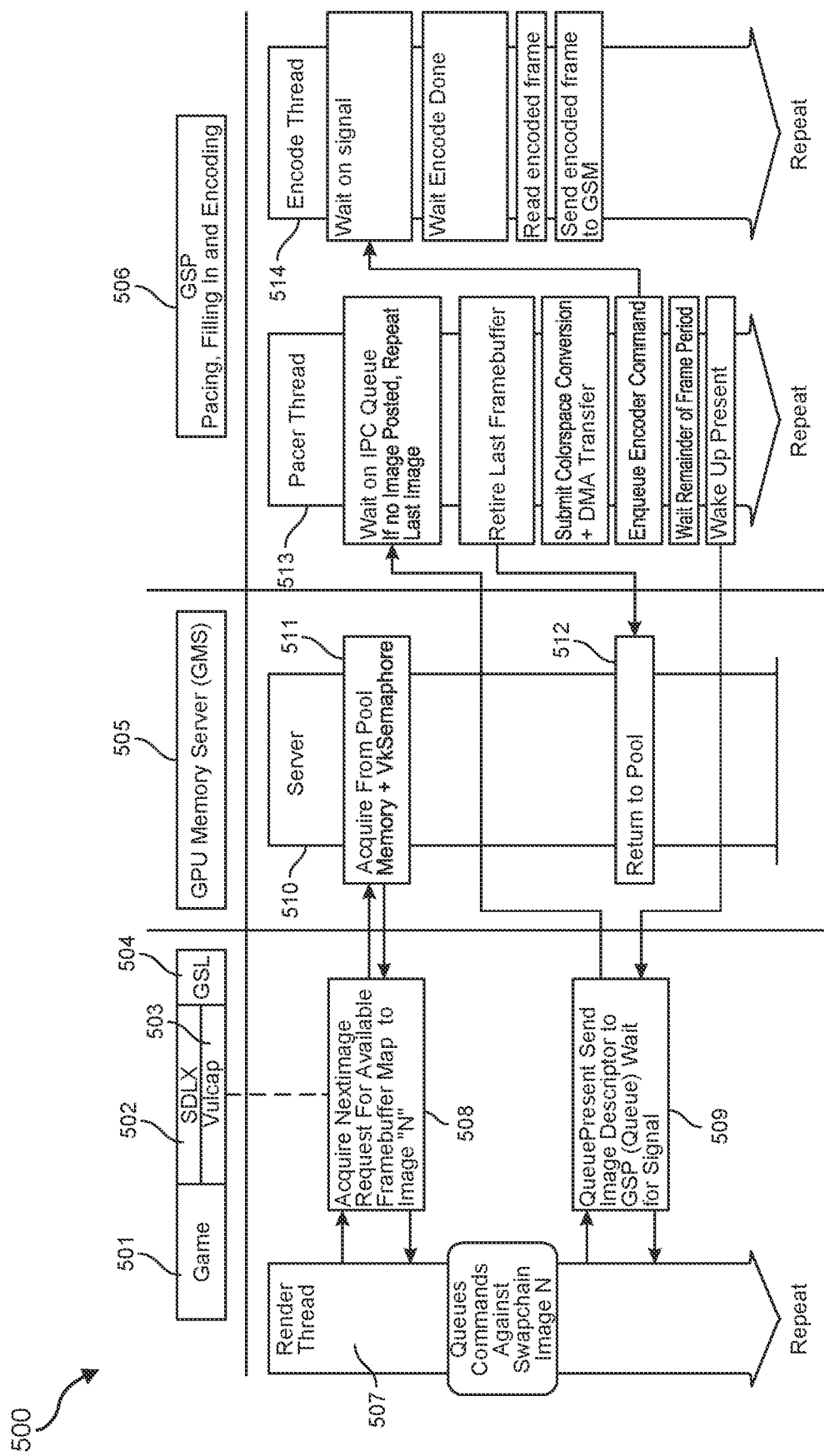
FIG. 5 illustrates an alternative flow diagram in which frames may be paced according to a specific frame rate.

FIG. 5 generally illustrates this process 500, in which SDLX 502, Vulcap 503, and GSL 504 are operated in conjunction with a cloud game 501. A render thread 507 queues commands against a swapchain N. The Vulcap acquires a next image or video frame at 508 and sends a request for an available frame buffer. A server instance 510 (which may be separate from the GPU memory server 505) then acquires information from a pool descriptor. The render thread 507 then queues the image descriptor to the GSP at 509. A pacer thread 513 (which may be the same as the game loop pacers described above) then waits on the queue up to a frame period-based deadline. If no image is posted (e.g., the game stalled or was suspended), the pacer thread 513 repeats the last image. The pacer thread then retires the last frame buffer unless no image was posted, and the previous frame is reused.

The pacer thread submits color space conversion information and GPU commands to the server instance 510 and further enqueues encoder command signals to an encoder thread. The pacer thread 513 waits for the remainder of the frame period and wakes up when signaled. The server instance 510 then returns to the pool at 512. At the GSP 506, the encode thread waits on the encoder command signal and waits until encoding is finished at 514. The encode thread then reads the encoded frame and sends the encoded frame to the GSM. Thus, at least in this example, the pacer thread 513 may be implemented to maintain an average clock rate, and further provide the ability to change frame rate dynamically as well as perform game suspensions when needed.

In some embodiments, as noted in FIG. 1, when generating graphics for a cloud-based game, the frame generation input events 113 produced by the game engine may be diverted to the simulated library 109 in shared memory 108. In some cases, this diverting process is performed without altering the swapchain process 124. As mentioned above, a swapchain 125 is a series of virtual frame buffers used by the graphics processing unit and associated graphics APIs for synchronization, stutter reduction, and/or frame rate stabilization. Because the event diverting process can be performed without disrupting the swapchain, diverting the input events to the simulated library 108 can be performed to substantially any video game running on substantially any video game engine. The simulated library, then, allows for hooking, advanced queueing, and other features that are not available in traditional graphics generation architectures.

After a frame has been queued, rendered, and encoded, that encoded rendered frame is inserted back into the swapchain process 124 of an associated Vulkan driver. In some embodiments, the simulated library allows the media frame to be rendered and encoded without creating an input window. Indeed, while traditional systems may require the use of X windows or similar features to receive mouse, keyboard, and other inputs, the embodiments herein implement a simulated library 109 to render and encode video and audio frames without creating such an input window. Instead, peripheral inputs are injected at a predetermined injection point at a game process level. In this manner, the video game (or other multimedia application) functions as if the application were communicating directly with a display server when, in actuality, the application is communicating with the simulated library 109 in shared memory 108.

Still further, because the swapchain process is not interrupted, the embodiments described herein are generally nonintrusive. That is, the cloud video game does not think that it is communicating with a simulated library. However, because the video game is communicating with the simulated library 109, that library can provide access to the video game's audio and video, allowing queueing and other techniques to be performed in advance. Moreover, media frame references and audio buffers are provided to a game support process, which creates a pipeline directly from the multimedia application to the encoder 123. This pipeline (as generally described in FIG. 4) allows more tasks to be performed in a simultaneous, overlapping manner, which speeds up the rendering and encoding processes and provides a more desirable gameplay experience to the user.

In some cases, the created pipeline directly from the multimedia application to the encoder allows synchronization to be performed on the GPU without support from an associated central processing unit (CPU). Accordingly, in these cases, the GPU does not wait on and is not dependent on the CPU, and the CPU does not wait on and is not dependent on the GPU. Instead, when a video frame has been rendered, it provides a fence signal that the encoder 123 will see and pick up the frame for encoding. The pipeline described in FIG. 4 from the multimedia application 112 to the encoder 123 allows synchronization to take place within the GPU 120 and does not need assistance from a CPU (e.g., 102).

At least in some cases, because the systems herein may lack a proper display system or controller (because, at least in some cases as noted above, the server is headless) these systems emulate the display interrupts in software and perform that emulation without drifting. In some cases, the drift is avoided "on average." The drifting can happen because of the system clock drift or the inability of the kernel scheduler to schedule every task at exactly the requested time. In some cases, a pacing module is implemented within the GPU to avoid synchronization drift with the output display. Then, even if, for example, the game was slightly late producing a frame, the pacing module will help recover and compensate for that momentary drift.

In some embodiments, the CPU may asynchronously provide data or information to the GPU 120. For instance, the CPU may provide metadata, fence references, or frame references to various components of the GPU. This information may be used to identify specific video frames or sequences of frames, for example. In such cases, the synchronization is performed between hardware components 121 of the GPU 120.

In some embodiments, diverting the media frame generation input events 113 produced as part of the multimedia application 112 to the simulated library 109 allows dynamic control over the frame rate of the media frames 115 produced by the multimedia application. In some cases, for instance, diverting frame generation input events 113 to the simulated library 109 allows a dynamic and substantially instantaneous change in encoded frame rate (e.g., from 30 fps to 60 fps). In other cases, diverting frame generation input events 113 to the simulated library 109 allows the multimedia application 112 to be suspended for at least a minimum specified amount of time. The suspension may end at the request of a user or as controlled by the game engine.

In some examples, upon determining that a client device 126 has dropped media frames, the graphics processing architecture reencodes the dropped frame by the GPU. That reencoded frame is then sent to the client device for display. Some video games may involve multiple cameras or multiple displays. In such scenarios, the graphics processing architecture may be configured to send different camera feeds to different graphics processing pipelines. Thus, for example, in a kart driving game, different gaming world views and game progress contexts are provided for different users, using the same game process for rendering. In some cases, the embodiments herein implement multiple swapchains in the same game to provide the different camera views to the client device(s). Moreover, multiple encoded streams may be provided for the same swapchain, where the same content is provided to different devices that may each have different playback capabilities. In this manner, the graphics processing architectures described herein provide support for multiple streams from a single game, and even at different resolutions or encoded frame rates.

In addition, a corresponding system includes at least one physical processor, and physical memory comprising computer-executable instructions that, when executed by the physical processor, cause the physical processor to: instantiate a simulated library in a shared memory that is shared between a plurality of hardware components in a graphics processing unit (GPU), divert one or more media frame generation input events produced as part of a multimedia application to the simulated library in the shared memory, select at least one media frame for rendering, according to the one or more media frame generation input events, from within the simulated library in the shared memory, queue the selected media frame for encoding before rendering of the selected media frame is complete, and upon determining that the selected media frame has been rendered, encode the rendered media frame according to the queueing.

In some examples, the above-described method is encoded as computer-readable instructions on a computer-readable medium. For example, the computer-readable medium may include one or more computer-executable instructions that, when executed by at least one processor of a computing device, cause the computing device to instantiate a simulated library in a shared memory that is shared between a plurality of hardware components in a graphics processing unit (GPU), divert one or more media frame generation input events produced as part of a multimedia application to the simulated library in the shared memory, select at least one media frame for rendering, according to the one or more media frame generation input events, from within the simulated library in the shared memory, queue the selected media frame for encoding before rendering of the selected media frame is complete, and upon determining that the selected media frame has been rendered, encode the rendered media frame according to the queueing.

Figure 6:
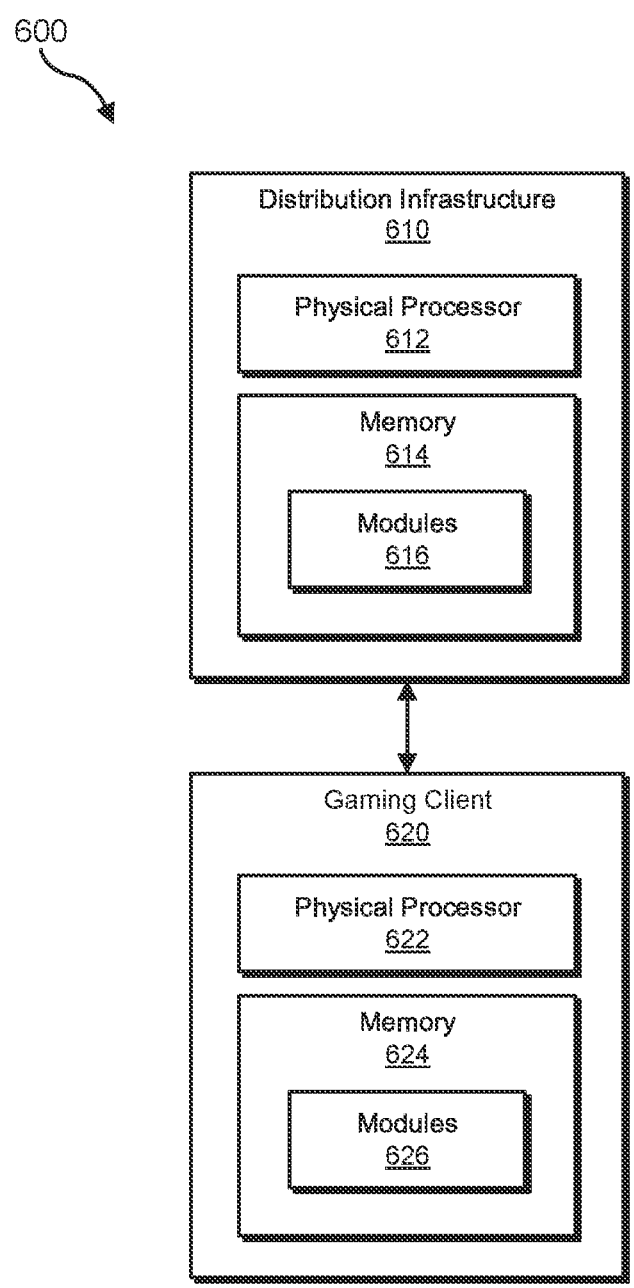
FIG. 6 is a block diagram of an exemplary content distribution ecosystem.
Figure 7:
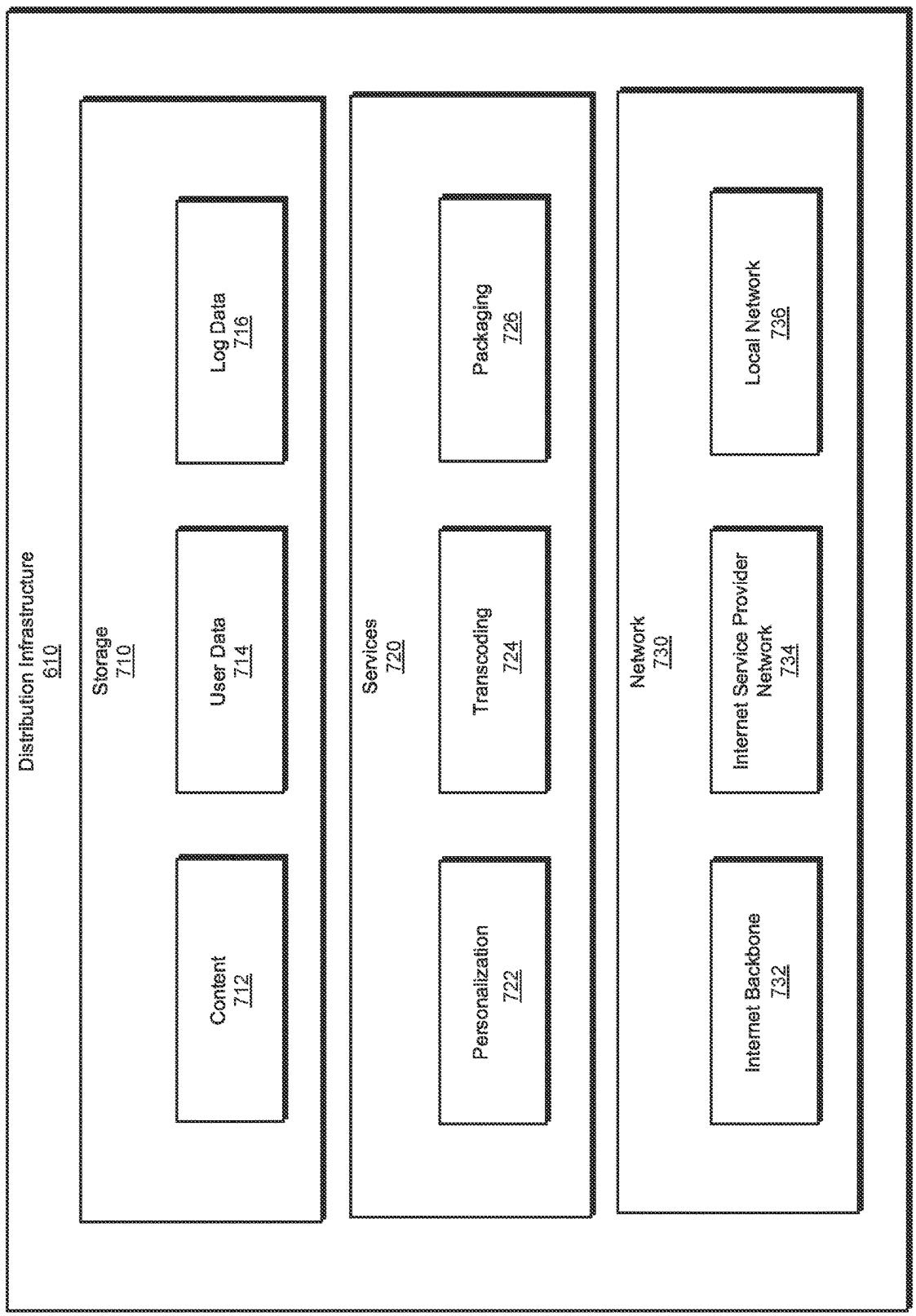
FIG. 7 is a block diagram of an exemplary distribution infrastructure within the content distribution ecosystem shown in FIG. 6.
Figure 8:
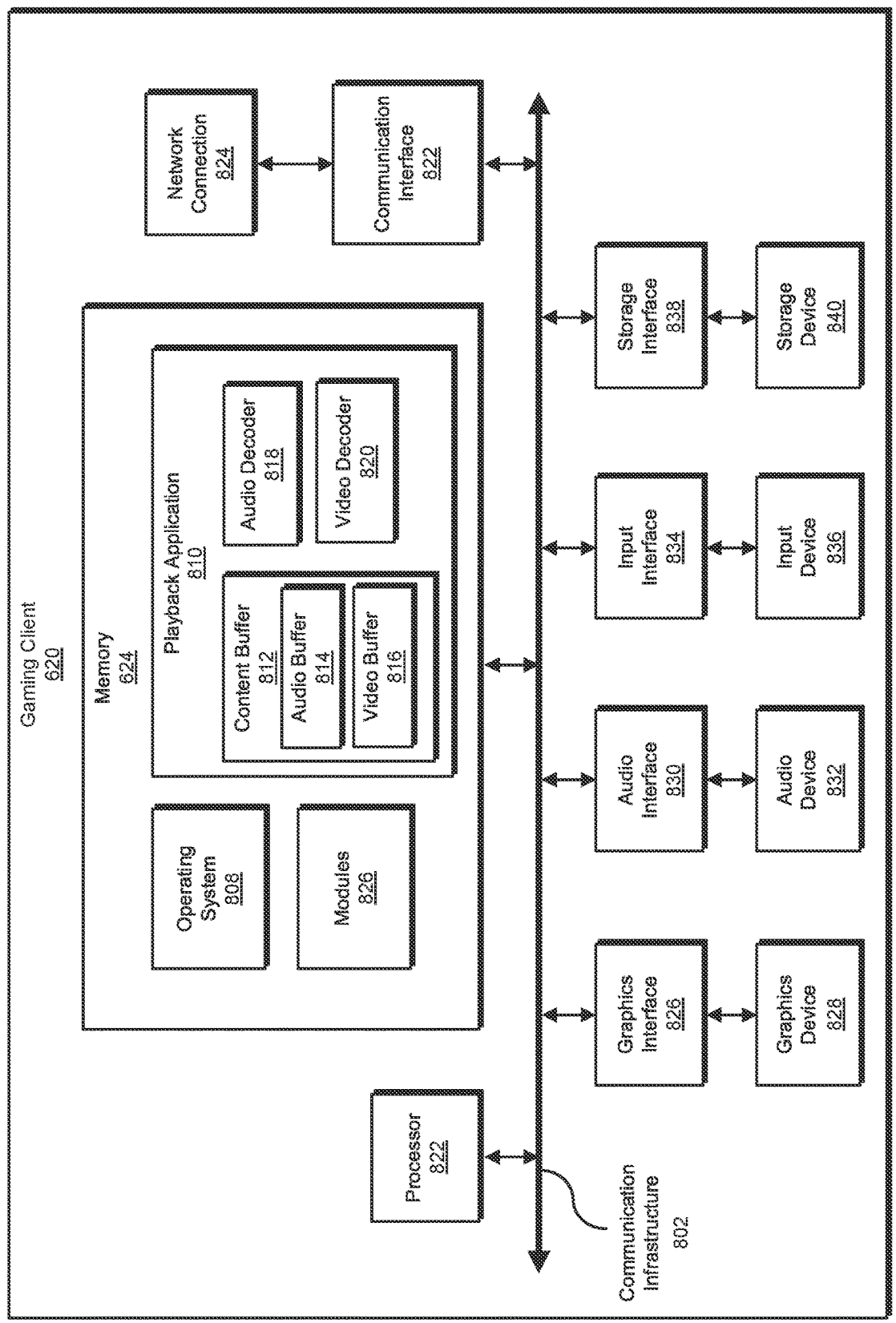
FIG. 8 is a block diagram of an exemplary content player within the content distribution ecosystem shown in FIG. 6.

FIGS. 6-8 illustrate cloud gaming systems, infrastructure, and clients that may be implemented with the embodiments herein. For example, the following will provide, with reference to FIG. 6, detailed descriptions of exemplary ecosystems in which content is provisioned to end nodes and in which requests for content are steered to specific end nodes. The discussion corresponding to FIGS. 7 and 8 presents an overview of an exemplary distribution infrastructure and an exemplary content player used during playback sessions, respectively.

FIG. 6 is a block diagram of a content distribution ecosystem 600 that includes a distribution infrastructure 610 in communication with a gaming client 620, content player, or other software application designed to present rendered graphics to a user. In some embodiments, distribution infrastructure 610 is configured to encode data at a specific data rate and to transfer the encoded data to gaming client 620. Gaming client 620 is configured to receive the encoded data via distribution infrastructure 610 and to decode the data for playback to a user. The data provided by distribution infrastructure 610 includes, for example, audio, video, text, images, animations, interactive content, haptic data, virtual or augmented reality data, location data, gaming data, or any other type of data that is provided via streaming.

Distribution infrastructure 610 generally represents any services, hardware, software, or other infrastructure components configured to deliver content to end users. For example, distribution infrastructure 610 includes content aggregation systems, media transcoding and packaging services, network components, and/or a variety of other types of hardware and software. In some cases, distribution infrastructure 610 is implemented as a highly complex distribution system, a single media server or device, or anything in between. In some examples, regardless of size or complexity, distribution infrastructure 610 includes at least one physical processor 612 and at least one memory device 614. One or more modules 616 are stored or loaded into memory 614 to enable adaptive streaming, as discussed herein.

Gaming client 620 generally represents any type or form of device or system capable of playing audio, video, or other gaming content that has been provided over distribution infrastructure 610. Examples of gaming client 620 include, without limitation, mobile phones, tablets, laptop computers, desktop computers, televisions, set-top boxes, digital media players, virtual reality headsets, augmented reality glasses, and/or any other type or form of device capable of rendering digital content. As with distribution infrastructure 610, gaming client 620 includes a physical processor 622, memory 624, and one or more modules 626. Some or all of the adaptive streaming processes described herein is performed or enabled by modules 626, and in some examples, modules 616 of distribution infrastructure 610 coordinate with modules 626 of gaming client 620 to provide adaptive streaming of multimedia content.

In certain embodiments, one or more of modules 616 and/or 626 in FIG. 6 represent one or more software applications or programs that, when executed by a computing device, cause the computing device to perform one or more tasks. For example, and as will be described in greater detail below, one or more of modules 616 and 626 represent modules stored and configured to run on one or more general-purpose computing devices. One or more of modules 616 and 626 in FIG. 6 also represent all or portions of one or more special-purpose computers configured to perform one or more tasks.

In addition, one or more of the modules, processes, algorithms, or steps described herein transform data, physical devices, and/or representations of physical devices from one form to another. For example, one or more of the modules recited herein receive audio data to be encoded, transform the audio data by encoding it, output a result of the encoding for use in an adaptive audio bit-rate system, transmit the result of the transformation to a content player, and render the transformed data to an end user for consumption. Additionally or alternatively, one or more of the modules recited herein transform a processor, volatile memory, non-volatile memory, and/or any other portion of a physical computing device from one form to another by executing on the computing device, storing data on the computing device, and/or otherwise interacting with the computing device.

Physical processors 612 and 622 generally represent any type or form of hardware-implemented processing unit capable of interpreting and/or executing computer-readable instructions. In one example, physical processors 612 and 622 access and/or modify one or more of modules 616 and 626, respectively. Additionally or alternatively, physical processors 612 and 622 execute one or more of modules 616 and 626 to facilitate adaptive streaming of multimedia content. Examples of physical processors 612 and 622 include, without limitation, microprocessors, microcontrollers, central processing units (CPUs), field-programmable gate arrays (FPGAs) that implement softcore processors, application-specific integrated circuits (ASICs), portions of one or more of the same, variations or combinations of one or more of the same, and/or any other suitable physical processor.

Memory 614 and 624 generally represent any type or form of volatile or non-volatile storage device or medium capable of storing data and/or computer-readable instructions. In one example, memory 614 and/or 624 stores, loads, and/or maintains one or more of modules 616 and 626. Examples of memory 614 and/or 624 include, without limitation, random access memory (RAM), read only memory (ROM), flash memory, hard disk drives (HDDs), solid-state drives (SSDs), optical disk drives, caches, variations or combinations of one or more of the same, and/or any other suitable memory device or system.

FIG. 7 is a block diagram of exemplary components of content distribution infrastructure 610 according to certain embodiments. Distribution infrastructure 610 includes storage 710, services 720, and a network 730. Storage 710 generally represents any device, set of devices, and/or systems capable of storing content for delivery to end users. Storage 710 includes a central repository with devices capable of storing terabytes or petabytes of data and/or includes distributed storage systems (e.g., appliances that mirror or cache content at Internet interconnect locations to provide faster access to the mirrored content within certain regions). Storage 710 is also configured in any other suitable manner.

As shown, storage 710 may store a variety of different items including content 712, user data 714, and/or log data 716. Content 712 includes television shows, movies, video games, user-generated content, and/or any other suitable type or form of content. User data 714 includes personally identifiable information (PII), payment information, preference settings, language and accessibility settings, and/or any other information associated with a particular user or content player. Log data 716 includes viewing history information, network throughput information, and/or any other metrics associated with a user's connection to or interactions with distribution infrastructure 610.

Services 720 includes personalization services 722, transcoding services 724, and/or packaging services 726. Personalization services 722 personalize recommendations, content streams, and/or other aspects of a user's experience with distribution infrastructure 610. Encoding services 724 compress media at different bitrates which, as described in greater detail below, enable real-time switching between different encodings. Packaging services 726 package encoded video before deploying it to a delivery network, such as network 730, for streaming.

Network 730 generally represents any medium or architecture capable of facilitating communication or data transfer. Network 730 facilitates communication or data transfer using wireless and/or wired connections. Examples of network 730 include, without limitation, an intranet, a wide area network (WAN), a local area network (LAN), a personal area network (PAN), the Internet, power line communications (PLC), a cellular network (e.g., a global system for mobile communications (GSM) network), portions of one or more of the same, variations or combinations of one or more of the same, and/or any other suitable network. For example, as shown in FIG. 7, network 730 includes an Internet backbone 732, an internet service provider 734, and/or a local network 736. As discussed in greater detail below, bandwidth limitations and bottlenecks within one or more of these network segments triggers video and/or audio bit rate adjustments.

FIG. 8 is a block diagram of an exemplary implementation of gaming client 620 of FIG. 6. Gaming client 620 generally represents any type or form of computing device capable of reading computer-executable instructions. Gaming client 620 includes, without limitation, laptops, tablets, desktops, servers, cellular phones, multimedia players, embedded systems, wearable devices (e.g., smart watches, smart glasses, etc.), smart vehicles, gaming consoles, internet-of-things (IoT) devices such as smart appliances, variations or combinations of one or more of the same, and/or any other suitable computing device.

As shown in FIG. 8, in addition to processor 622 and memory 624, gaming client 620 includes a communication infrastructure 802 and a communication interface 822 coupled to a network connection 824. Gaming client 620 also includes a graphics interface 826 coupled to a graphics device 828, an input interface 834 coupled to an input device 836, and a storage interface 838 coupled to a storage device 840.

Communication infrastructure 802 generally represents any type or form of infrastructure capable of facilitating communication between one or more components of a computing device. Examples of communication infrastructure 802 include, without limitation, any type or form of communication bus (e.g., a peripheral component interconnect (PCI) bus, PCI Express (PCIe) bus, a memory bus, a frontside bus, an integrated drive electronics (IDE) bus, a control or register bus, a host bus, etc.).

As noted, memory 624 generally represents any type or form of volatile or non-volatile storage device or medium capable of storing data and/or other computer-readable instructions. In some examples, memory 624 stores and/or loads an operating system 808 for execution by processor 622. In one example, operating system 808 includes and/or represents software that manages computer hardware and software resources and/or provides common services to computer programs and/or applications on gaming client 620.

Operating system 808 performs various system management functions, such as managing hardware components (e.g., graphics interface 826, audio interface 830, input interface 834, and/or storage interface 838). Operating system 808 also provides process and memory management models for playback application 810. The modules of playback application 810 includes, for example, a content buffer 812, an audio decoder 818, and a video decoder 820.

Playback application 810 is configured to retrieve digital content via communication interface 822 and to play the digital content through graphics interface 826. Graphics interface 826 is configured to transmit a rendered video signal to graphics device 828. In normal operation, playback application 810 receives a request from a user to play a specific title or specific content. Playback application 810 then identifies one or more encoded video and audio streams associated with the requested title. After playback application 810 has located the encoded streams associated with the requested title, playback application 810 downloads sequence header indices associated with each encoded stream associated with the requested title from distribution infrastructure 610. A sequence header index associated with encoded content includes information related to the encoded sequence of data included in the encoded content.

In one embodiment, playback application 810 begins downloading the content associated with the requested title by downloading sequence data encoded to the lowest audio and/or video playback bitrates to minimize startup time for playback. The requested digital content file is then downloaded into content buffer 812, which is configured to serve as a first-in, first-out queue. In one embodiment, each unit of downloaded data includes a unit of video data or a unit of audio data. As units of video data associated with the requested digital content file are downloaded to the gaming client 620, the units of video data are pushed into the content buffer 812. Similarly, as units of audio data associated with the requested digital content file are downloaded to the gaming client 620, the units of audio data are pushed into the content buffer 812. In one embodiment, the units of video data are stored in video buffer 816 within content buffer 812 and the units of audio data are stored in audio buffer 814 of content buffer 812.

A video decoder 820 reads units of video data from video buffer 816 and outputs the units of video data in a sequence of video frames corresponding in duration to the fixed span of playback time. Reading a unit of video data from video buffer 816 effectively de-queues the unit of video data from video buffer 816. The sequence of video frames is then rendered by graphics interface 826 and transmitted to graphics device 828 to be displayed to a user.

An audio decoder 818 reads units of audio data from audio buffer 814 and outputs the units of audio data as a sequence of audio samples, generally synchronized in time with a sequence of decoded video frames. In one embodiment, the sequence of audio samples is transmitted to audio interface 830, which converts the sequence of audio samples into an electrical audio signal. The electrical audio signal is then transmitted to a speaker of audio device 832, which, in response, generates an acoustic output.

In situations where the bandwidth of distribution infrastructure 610 is limited and/or variable, playback application 810 downloads and buffers consecutive portions of video data and/or audio data from video encodings with different bit rates based on a variety of factors (e.g., scene complexity, audio complexity, network bandwidth, device capabilities, etc.). In some embodiments, video playback quality is prioritized over audio playback quality. Audio playback and video playback quality are also balanced with each other, and in some embodiments audio playback quality is prioritized over video playback quality.

Graphics interface 826 is configured to generate frames of video data and transmit the frames of video data to graphics device 828. In one embodiment, graphics interface 826 is included as part of an integrated circuit, along with processor 622. Alternatively, graphics interface 826 is configured as a hardware accelerator that is distinct from (i.e., is not integrated within) a chipset that includes processor 622.

Graphics interface 826 generally represents any type or form of device configured to forward images for display on graphics device 828. For example, graphics device 828 is fabricated using liquid crystal display (LCD) technology, cathode-ray technology, and light-emitting diode (LED) display technology (either organic or inorganic). In some embodiments, graphics device 828 also includes a virtual reality display and/or an augmented reality display. Graphics device 828 includes any technically feasible means for generating an image for display. In other words, graphics device 828 generally represents any type or form of device capable of visually displaying information forwarded by graphics interface 826.

As illustrated in FIG. 8, gaming client 620 also includes at least one input device 836 coupled to communication infrastructure 802 via input interface 834. Input device 836 generally represents any type or form of computing device capable of providing input, either computer or human generated, to gaming client 620. Examples of input device 836 include, without limitation, a keyboard, a pointing device, a speech recognition device, a touch screen, a wearable device (e.g., a glove, a watch, etc.), a controller, variations or combinations of one or more of the same, and/or any other type or form of electronic input mechanism.

Gaming client 620 also includes a storage device 840 coupled to communication infrastructure 802 via a storage interface 838. Storage device 840 generally represents any type or form of storage device or medium capable of storing data and/or other computer-readable instructions. For example, storage device 840 may be a magnetic disk drive, a solid-state drive, an optical disk drive, a flash drive, or the like. Storage interface 838 generally represents any type or form of interface or device for transferring data between storage device 840 and other components of gaming client 620.

Many other devices or subsystems are included in or connected to gaming client 620. Conversely, one or more of the components and devices illustrated in FIG. 8 need not be present to practice the embodiments described and/or illustrated herein. The devices and subsystems referenced above are also interconnected in different ways from that shown in FIG. 8. Gaming client 620 is also employed in any number of software, firmware, and/or hardware configurations. For example, one or more of the example embodiments disclosed herein are encoded as a computer program (also referred to as computer software, software applications, computer-readable instructions, or computer control logic) on a computer-readable medium. The term "computer-readable medium," as used herein, refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, etc.), optical-storage media (e.g., Compact Disks (CDs), Digital Video Disks (DVDs), and BLU-RAY disks), electronic-storage media (e.g., solid-state drives and flash media), and other digital storage systems.

A computer-readable medium containing a computer program is loaded into gaming client 620. All or a portion of the computer program stored on the computer-readable medium is then stored in memory 624 and/or storage device 840. When executed by processor 622, a computer program loaded into memory 624 causes processor 622 to perform and/or be a means for performing the functions of one or more of the example embodiments described and/or illustrated herein. Additionally or alternatively, one or more of the example embodiments described and/or illustrated herein are implemented in firmware and/or hardware. For example, gaming client 620 is configured as an Application Specific Integrated Circuit (ASIC) adapted to implement one or more of the example embodiments disclosed herein

EXAMPLE EMBODIMENTS

Example 1: A computer-implemented method comprising: instantiating a simulated library in a shared memory that is shared between a plurality of hardware components in a graphics processing unit (GPU), diverting media frame generation input events produced as part of a multimedia application to the simulated library in the shared memory, selecting at least one media frame for rendering, according to the media frame generation input events, from within the simulated library in the shared memory, queueing the selected media frame for encoding before rendering of the selected media frame is complete and, upon determining that the selected media frame has been rendered, encoding the rendered media frame according to the queueing.

Example 2: The computer-implemented method of Example 1, wherein the selected frame comprises a video frame.

Example 3: The computer-implemented method of Example 1 or Example 2, wherein the selected frame comprises an audio frame.

Example 4: The computer-implemented method of any of Examples 1-3, wherein the multimedia application comprises a video game.

Example 5: The computer-implemented method of any of Examples 1-4, wherein the one or more frame generation input events are generated as part of a swapchain process running on the GPU, and wherein the one or more frame generation input events are diverted to the simulated library in shared memory without altering the swapchain process.

Example 6: The computer-implemented method of any of Examples 1-5, further comprising inserting the encoded rendered frame back into the swapchain process of a Vulkan driver.

Example 7: The computer-implemented method of any of Examples 1-6, wherein the simulated library allows the media frame to be rendered and encoded without creating an input window.

Example 8: The computer-implemented method of any of Examples 1-7, wherein peripheral inputs are injected at a predetermined injection point at a multimedia application process level.

Example 9: The computer-implemented method of any of Examples 1-8, wherein the multimedia application functions as if the multimedia application were communicating directly with a display server.

Example 10: The computer-implemented method of any of Examples 1-9, wherein media frame references and audio buffers are provided to a game support process, creating a pipeline directly from the multimedia application to an encoder.

Example 11: The computer-implemented method of any of Examples 1-10, wherein the created pipeline directly from the multimedia application to the encoder allows synchronization to be performed on the GPU without support from an associated central processing unit (CPU).

Example 12: The computer-implemented method of any of Examples 1-11, wherein the CPU provides at least one of: metadata, one or more fence references, or one or more frame references to one or more components of the GPU, while the synchronization is performed between hardware components of the GPU.

Example 13: A system comprising: at least one physical processor, and physical memory comprising computer-executable instructions that, when executed by the physical processor, cause the physical processor to: instantiate a simulated library in a shared memory that is shared between a plurality of hardware components in a graphics processing unit (GPU), divert one or more media frame generation input events produced as part of a multimedia application to the simulated library in the shared memory, select at least one media frame for rendering, according to the one or more media frame generation input events, from within the simulated library in the shared memory, queue the selected media frame for encoding before rendering of the selected media frame is complete, and upon determining that the selected media frame has been rendered, encode the rendered media frame according to the queueing.

Example 14: The system of Example 13, wherein diverting the one or more media frame generation input events produced as part of a multimedia application to the simulated library allows dynamic control over the frame rate of the media frames produced by the multimedia application.

Example 15: The system of Example 13 or Example 14, wherein diverting the one or more media frame generation input events produced as part of a multimedia application to the simulated library in the shared memory allows the multimedia application to be suspended for at least a specified amount of time.

Example 16: The system of any of Examples 13-15, further comprising: upon determining that a client device has dropped one or more media frames, reencoding the dropped frame by the GPU.

Example 17: The system of any of Examples 13-16, wherein a pacing module is implemented within the GPU to avoid synchronization drift with an associated output display.

Example 18: The system of any of Examples 13-17, further comprising attaching a plurality of video pipelines to one or more swapchain instances that are generated as part of the multimedia application.

Example 19: The system of any of Examples 13-18, wherein video feeds from multiple different cameras are fed to different video pipelines among the plurality of video pipelines.

Example 20: A non-transitory computer-readable medium comprising one or more computer-executable instructions that, when executed by at least one processor of a computing device, cause the computing device to: instantiate a simulated library in a shared memory that is shared between a plurality of hardware components in a graphics processing unit (GPU), divert one or more media frame generation input events produced as part of a multimedia application to the simulated library in the shared memory, select at least one media frame for rendering, according to the one or more media frame generation input events, from within the simulated library in the shared memory, queue the selected media frame for encoding before rendering of the selected media frame is complete, and upon determining that the selected media frame has been rendered, encode the rendered media frame according to the queueing.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   instantiating a simulated library in a shared memory that is shared between a plurality of hardware components in a graphics processing unit (GPU);
   diverting one or more media frame generation input events produced as part of a multimedia application to the simulated library in the shared memory;
   selecting at least one media frame for rendering, according to the one or more media frame generation input events, from within the simulated library in the shared memory;
   queueing the selected media frame for encoding before rendering of the selected media frame is complete; and
   upon determining that the selected media frame has been rendered, encoding the rendered media frame according to the queueing.

2. The computer-implemented method of claim 1, wherein the selected frame comprises a video frame.

3. The computer-implemented method of claim 1, wherein the selected frame comprises an audio frame.

4. The computer-implemented method of claim 1, wherein the multimedia application comprises a video game.

5. The computer-implemented method of claim 1, wherein the one or more frame generation input events are generated as part of a swapchain process running on the GPU, and wherein the one or more frame generation input events are diverted to the simulated library in the shared memory without altering the swapchain process.

6. The computer-implemented method of claim 5, further comprising inserting the encoded rendered frame back into the swapchain process of a Vulkan driver.

7. The computer-implemented method of claim 1, wherein the simulated library allows the media frame to be rendered and encoded without creating an input window.

8. The computer-implemented method of claim 7, wherein peripheral inputs are injected at a predetermined injection point at a multimedia application process level.

9. The computer-implemented method of claim 7, wherein the multimedia application functions as if the multimedia application were communicating directly with a display server.

10. The computer-implemented method of claim 1, wherein media frame references and audio buffers are provided to a game support process, creating a pipeline directly from the multimedia application to an encoder.

11. The computer-implemented method of claim 10, wherein the created pipeline directly from the multimedia application to the encoder allows synchronization to be performed on the GPU without support from an associated central processing unit (CPU).

12. The computer-implemented method of claim 11, wherein the CPU provides at least one of: metadata, one or more fence references, or one or more frame references to one or more components of the GPU, while the synchronization is performed between hardware components of the GPU.

13. A system comprising:
   at least one physical processor; and
   physical memory comprising computer-executable instructions that, when executed by the physical processor, cause the physical processor to:
   instantiate a simulated library in a shared memory that is shared between a plurality of hardware components in a graphics processing unit (GPU);
   divert one or more media frame generation input events produced as part of a multimedia application to the simulated library in the shared memory;
   select at least one media frame for rendering, according to the one or more media frame generation input events, from within the simulated library in the shared memory;
   queue the selected media frame for encoding before rendering of the selected media frame is complete; and
   upon determining that the selected media frame has been rendered, encode the rendered media frame according to the queueing.

14. The system of claim 13, wherein diverting the one or more media frame generation input events produced as part of a multimedia application to the simulated library allows dynamic control over a frame rate of the media frames produced by the multimedia application.

15. The system of claim 13, wherein diverting the one or more media frame generation input events produced as part of the multimedia application to the simulated library in the shared memory allows the multimedia application to be suspended for at least a specified amount of time.

16. The system of claim 13, further comprising: upon determining that a client device has dropped one or more media frames, reencoding the dropped frame by the GPU.

17. The system of claim 13, wherein a pacing module is implemented within the GPU to avoid synchronization drift with an associated output display.

18. The system of claim 13, further comprising attaching a plurality of video pipelines to one or more swapchain instances that are generated as part of the multimedia application.

19. The system of claim 18, wherein video feeds from multiple different cameras are fed to different video pipelines among the plurality of video pipelines.

20. A non-transitory computer-readable medium comprising one or more computer-executable instructions that, when executed by at least one processor of a computing device, cause the computing device to:
   instantiate a simulated library in a shared memory that is shared between a plurality of hardware components in a graphics processing unit (GPU);
   divert one or more media frame generation input events produced as part of a multimedia application to the simulated library in the shared memory;
   select at least one media frame for rendering, according to the one or more media frame generation input events, from within the simulated library in the shared memory;
   queue the selected media frame for encoding before rendering of the selected media frame is complete; and
   upon determining that the selected media frame has been rendered, encode the rendered media frame according to the queue.

* * * * *